United States Patent
Adams et al.

(10) Patent No.: US 12,516,379 B2
(45) Date of Patent: Jan. 6, 2026

(54) METHODS OF USING GIANT CELL NUCLEIC ACID CHARACTERIZATION IN CANCER SCREENING, DIAGNOSTICS, TREATMENT AND RECURRENCE

(71) Applicant: Creatv MicroTech, Inc., Potomac, MD (US)

(72) Inventors: Daniel Adams, Basking Ridge, NJ (US); Cha-Mei Tang, Potomac, MD (US)

(73) Assignee: CREATV MICROTECH, INC., Potomac, MD (US)

( * ) Notice: Subject to any disclaimer, the term of this patent is extended or adjusted under 35 U.S.C. 154(b) by 481 days.

(21) Appl. No.: 16/498,581

(22) PCT Filed: Apr. 2, 2018

(86) PCT No.: PCT/US2018/025680
§ 371 (c)(1),
(2) Date: Sep. 27, 2019

(87) PCT Pub. No.: WO2018/184005
PCT Pub. Date: Oct. 4, 2018

(65) Prior Publication Data
US 2020/0049713 A1    Feb. 13, 2020

Related U.S. Application Data

(60) Provisional application No. 62/479,759, filed on Mar. 31, 2017.

(51) Int. Cl.
*C12Q 1/6886* (2018.01)
(52) U.S. Cl.
CPC ..... *C12Q 1/6886* (2013.01); *C12Q 2600/156* (2013.01)
(58) Field of Classification Search
None
See application file for complete search history.

(56) References Cited

FOREIGN PATENT DOCUMENTS

| WO | 2013/181532 | 12/2013 |
|---|---|---|
| WO | 2016/033103 | 3/2016 |
| WO | 2016/191532 | 12/2016 |

OTHER PUBLICATIONS

Tang et al. Mar. 16, 2017, Filtration and Analysis of Circulating Cancer Associated Cells from the Blood of Cancer Patients. In: Prickril B., Rasooly A. (eds) Biosensors and Biodetection. Methods in Molecular Biology, vol. 1572. Humana Press, New York, NY, 14 pages (Year: 2017).*
Zhu et al J. Transl. Med. 2016. 14:198, 12 pages (Year: 2016).*
Adams et al RSC Adv. 2016. 6: 6405 (Year: 2016).*
Akadeum Life Sciences. "CTC Separation: Circulating Tumor Cells Isolation Methods and CTC Isolation from Whole Blood" available via URL: < akadeum.com/blog/ctc-separation-circulating-tumor-cells-isolation-methods-and-ctc-isolation-from-whole-blood/?cn-reloaded=1> (Year: 2023).*
International Search Report and Written Opinion of the International Searching Authority, issued Jun. 8, 2018 in corresponding International Patent Application No. PCT/US2018/025680.
Adams et al., "Circulating giant macrophages as a potential biomarker of solid tumors", PNAS, 111(9): 3514-3519 (2014).
Adams et al., "Circulating Cancer-Associated Macrophage-Like Cells Differentiate Malignant Breast Cancer and Benign Breast Conditions", Cancer Epidemiology, Biomarkers & Prevention, 25(7): 1037-1042 (2016).

* cited by examiner

*Primary Examiner* — Carla J Myers
(74) *Attorney, Agent, or Firm* — Wenderoth, Lind & Ponack, L.L.P.

(57) ABSTRACT

The characterization of nucleic acids obtained from cancer-associated cells circulating in the blood of a subject, and the use of such characterizations in cancer screening, diagnostics, treatment, and recurrence, are disclosed.

14 Claims, 5 Drawing Sheets

(HR= 9.1, 95%CI=2.6-31.3, p=0.0014)

METHODS OF USING GIANT CELL NUCLEIC ACID CHARACTERIZATION IN CANCER SCREENING, DIAGNOSTICS, TREATMENT AND RECURRENCE

FIELD OF THE INVENTION

The present invention generally relates to characterization of nucleic acids obtained from cancer-associated cells circulating in the blood of a subject, and the use of such characterizations in cancer screening, diagnostics, treatment, and recurrence.

BACKGROUND OF THE INVENTION

Driver mutations in cancer, generally defined as mutations within a gene that confer a selective growth advantage on a cell, and thus promote cancer development, are typically found through analysis of tumor tissue. The analysis for mutations can use many available molecular techniques (i.e. PCR, sequencing, in situ hybridization, etc.).

Driver mutations can be difficult to study because of cell heterogeneity and the ability of resistance in subpopulations to exist. In the case of tumor heterogeneity, different cell populations with different mutations exist spatially within tumors. Therefore when a small piece of tumor tissue is used in the analysis of mutations, the mutations may only represent a small portion of the mutations actually present in the total tumor population. In the case of resistant subpopulations, over time and treatments, subpopulations of tumor cells with drug resistant mutations begin to propagate in the tumor area. Because resistance happens temporally, the original tissue tested for mutations may not have the resistant mutations, which appears later in development of the disease.

Multiple methods can be used to test for heterogeneity and temporally for resistant tumor subpopulations.

First, tumor tissue can be obtained from biopsy or from surgically removed tumor after an operation. The advantage of obtaining tumor tissue is that it provides an adequate number of tumor cells from which to obtain accurate mutational analysis. However, there are a number of potential problems. A tumor might change after tissue is obtained. Obtaining tumor biopsies can be difficult, might not be possible, might be dangerous, costly and painful. Additionally, a re-biopsy may only isolate a single subpopulation while numerous heterogeneous populations may exist. Tissue samples cannot cover all areas of the tumor.

Second, circulating tumor DNA (ctDNA) is tumor-derived, fragmented DNA found in the bloodstream that is not associated with cells. ctDNA is just a small fraction of cell-free DNA (cfDNA) found in the blood, where cfDNA accounts for all DNA in the blood and it is not limited to DNA of tumor origin. Currently there are a number of research, development and commercialization efforts utilizing ctDNA for a spectrum of clinical utilities.

Blood plasma is used as the source of ctDNA for the tumor analysis. The advantages of ctDNA is that it is possible to obtain plasma in real time. However, there are a number of disadvantages. ctDNA analysis often misidentifies non-malignant background mutations not associated with the tumor and may not identify the rarer tumor mutations from the more common background nucleic acids from normal tissue. As a person ages, mutations not associated with tumors begin occurring in the body naturally that will be mistakenly identified in the ctDNA. Another cause of concern using ctDNA is that the concentration of ctDNA is low compared to DNA from cells from the rest of the body.

Early release of a special article by Merker, J D, et al., Circulating Tumor DNA Analysis in Patients with Cancer, American Society of Clinical Oncology and College of American Pathologists Joint Review, 2018 (doi: 10.5858/arpa.2018-0901-SA) discusses the issues of applications utilizing ctDNA. At this time, their conclusion of ctDNA for solid tumors and the analysis of sequence or copy number variants in DNA are as follow: "Some ctDNA assays have demonstrated clinical validity and utility with certain types of advanced cancer; however, there is insufficient evidence of clinical validity and utility for the majority of ctDNA assays in advanced cancer. Evidence shows discordance between the results of ctDNA assays and genotyping tumor specimens and supports tumor tissue genotyping to confirm undetected results from ctDNA tests. There is no evidence of clinical utility and little evidence of clinical validity of ctDNA assays in early-stage cancer, treatment monitoring, or residual disease detection. There is no evidence of clinical validity and clinical utility to suggest that ctDNA assays are useful for cancer screening, outside of a clinical trial."

Third, a commonly recognized potential sources of samples of tumor associated cells are circulating tumor cells (CTCs) in the blood of patients with solid tumors. However, CTCs are able to provide real time tumor samples only if there are sufficient number of CTCs collected. Currently, there is a push for sequencing analysis from single cells by commercial companies and researchers. The advantage of sequencing CTCs is the ability to provide real time mutational analysis. Again, there are also many disadvantages. (i) For the majority of solid tumors, CTCs are not found in patients. Cancers that have more CTCs are largely limited to breast, prostate and colorectal cancers. (ii) Even for these three types of cancer, CTCs are primarily found in late stage patients and largely absent in early stages. Even in stage IV patients, CTCs are only found about 50% of the time. (iii) The accuracy of the mutational analysis depends on the number of CTCs and the sequencing method. The number of CTCs required for accurate analysis for large number of cancer mutations is 5-50 CTCs. (iv) Criteria to accurately identify CTCs is lacking.

It is thus evident that there is a need for additional means for obtaining and using nucleic acids of cancer-associated cells. Development of such means will provide new, less invasive methods for cancer screening, diagnostics, treatment, and recurrence. The present invention is directed to such means, along with other related goals.

SUMMARY OF THE INVENTION

As discussed in detail below, the present invention is generally directed to collecting and analyzing nucleic acids obtained from cancer-associated cells isolated from the blood of a subject, subjecting the nucleic acids to molecular analysis, and using the data obtained from the analysis in cancer screening, diagnostics, treatment, and recurrence. Epigenetic modifications in the cancer-associated cells can be analyzed in conjunction with nucleic acid analysis.

The nucleic acids are collected from circulating cancer cells, cancer stromal cells, giant cells, isolated from the blood of subjects, such as cancer patients. Naked nuclei produced by such cells are also isolated and collected from the blood of the subjects. The invention describes (i) methods, tools, and reagents to collect such cells, as well as naked nuclei from such cells, found in the blood, lymphatic circulation, serum, bone marrow, urine, saliva, cerebral spinal fluid, and other body fluids, (ii) assay methods to obtain molecular information from the cells and naked nuclei, (iii) advantages of obtaining molecular information from the cells and naked nuclei versus other methods, and (iv) use of the molecular information.

The methods to collect the cells and naked nuclei are based on the use of size-based separation techniques such as filtration and size selection, as well as the use of cell specific antigens, which can also be used for molecular characterization and mutation analysis of the cells. The cells can be isolated from tissue, blood and other fluids of a subject, where the cells contain molecular changes associated with primary/secondary tumors, or molecular changes that are independent of the tumors but remain a clinical target of interest. Typically these mutations are used in determining early detection, prognostic, diagnostic or predictive information of cancer. As formation of cells, such as giant cells, is directly associated with tumor growth, progression and spread, the ability to detect molecular changes found within the cell may directly correlate with treatment. The cells and naked nuclei can be purified from blood in most solid malignancies, in non-solid tumors, and in premalignant conditions so that the cells and naked nuclei can then undergo molecular characterization.

In the first embodiment, the invention comprises methods to collect intact or undegraded nucleic acids from patient samples with solid tumors, consisting of methods to collect giant cells and giant naked nuclei by size exclusion method. In one aspect, the invention is directed to a method for collecting giant cells, or giant naked nuclei, or both, from a biological sample comprising subjecting a biological sample obtained from a subject to a size exclusion methodology, thereby collecting giant cells, or giant naked nuclei, or both, from a biological sample. In some aspects, the invention may further comprise isolating intact or undegraded nucleic acids from the giant cells, or giant naked nuclei, or both. In some aspects, the invention also may further comprise analyzing for cancer-associated molecular changes in intact or undegraded nucleic acids from the giant cells, or giant naked nuclei, or both. In some aspects, the invention may further comprise analyzing the collected giant cells for epigenetic modifications, in addition to the analysis of nucleic acids from such cells.

In the second embodiment, the invention comprises methods to collect intact or undegraded nucleic acids from patient samples with solid tumors, consisting of methods to collect giant cells and giant naked nuclei by analyte capture element based on surface markers, and/or analyte capture element based on intracellular markers. In one aspect, the invention is directed to a method for collecting giant cells, or giant naked nuclei, or both, from a biological sample comprising subjecting a biological sample obtained from a subject to an analyte capture methodology that uses surface markers of the giant cells and/or giant naked nuclei, thereby collecting giant cells, or giant naked nuclei, or both, from a biological sample. In some aspects, the invention may further comprise isolating intact or undegraded nucleic acids from the giant cells, or giant naked nuclei, or both. In some aspects, the invention also may further comprise analyzing for cancer-associated molecular changes in intact or undegraded nucleic acids from the giant cells, or giant naked nuclei, or both. In some aspects, the invention may further comprise analyzing the collected giant cells for epigenetic modifications, in addition to the analysis of nucleic acids from such cells.

In a third embodiment, the invention comprises methods to collect intact or undegraded nucleic acids from patient samples with solid tumors, consisting of method to collect collecting giant cells and giant naked nuclei by red blood cell lysis and white blood cell depletion. Red blood cell lysis can lyse some CAMLs. White blood cell depletion can remove some CAMLs. In one aspect, the invention is directed to a method for collecting giant cells, or giant naked nuclei, or both, from a biological sample comprising subjecting a biological sample obtained from a subject to red blood cell lysis, or white blood cell depletion, or both, thereby collecting giant cells, or giant naked nuclei, or both, from a biological sample. In some aspects, the invention may further comprise isolating intact or undegraded nucleic acids from the giant cells, or giant naked nuclei, or both. In some aspects, the invention also may further comprise analyzing for cancer-associated molecular changes in intact or undegraded nucleic acids from the giant cells, or giant naked nuclei, or both. In some aspects, the invention may further comprise analyzing the collected giant cells for epigenetic modifications, in addition to the analysis of nucleic acids from such cells.

In another embodiment, the invention comprises methods to analyze the intact nucleic acids for cancer associated molecular changes. One can perform the analysis on single giant cell, group of giant cells, single giant naked nuclei, group of giant naked nuclei, and giant cells with giant naked nuclei. Similarly, in certain of the first through third embodiments of the invention, and aspects thereof, the analysis of intact or undegraded nucleic acids from giant cells and/or giant naked nuclei may be the analysis of nucleic acids from a single giant cell, a group of giant cells, a single giant naked nuclei, a group of giant naked nuclei, or both giant cells and giant naked nuclei. In some aspects of the invention, the analysis of intact or undegraded nucleic acids will be limited to analysis of intact or undegraded nucleic acids from giant cells and/or giant naked nuclei. In other aspects of the invention, intact or undegraded nucleic acids from other cells not associated with cancer that were also captured when the giant cells and/or giant naked nuclei were isolated will be included in the analysis as background or contaminating nucleic acids. Such other cells include, but are not limited to, white blood cells. In some aspects, the invention may further comprise analyzing the giant cells for epigenetic modifications, in addition to the analysis of nucleic acids from such cells.

In another embodiment, the invention comprises methods to analyze the intact nucleic acids for cancer associated molecular changes. One can perform the analysis on giant cells with circulating tumor cells (CTCs), giant naked nuclei with CTCs, and giant cells and giant naked nuclei together with CTCs, circulating endothelial cells (CECs), epithelial mesenchymal transition cells (EMTs), clusters and other cells. Similarly, in certain of the first through third embodiments of the invention, and aspects thereof, the analysis of intact or undegraded nucleic acids from giant cells and/or giant naked nuclei may further comprise the analysis of intact or undegraded nucleic acids from one or more of CTCs, CECs, and EMTs in conjunction with the analysis of nucleic acids from a single giant cell, a group of giant cells, a single giant naked nuclei, a group of giant naked nuclei, or both giant cells and giant naked nuclei. In some aspects of the invention, the analysis of intact or undegraded nucleic acids will be limited to analysis of intact or undegraded nucleic acids from giant cells, CTCs, CECs, and EMTs and/or giant naked nuclei. In other aspects of the invention, intact or undegraded nucleic acids from other cells not associated with cancer that were also captured when the giant cells, CTCs, CECs, and EMTs and/or giant naked nuclei were isolated will be included in the analysis as background or contaminating nucleic acids. Such other cells include, but are not limited to, white blood cells. In some aspects, the invention may further comprise analyzing the cells (e.g., giant cells, CTCs, CECs, EMTs, etc.), for epigenetic modifications, in addition to the analysis of nucleic acids from such cells.

In another embodiment, the invention comprises methods to analyze the nucleic acids for molecular changes from all the cells captured by size exclusion methodology. Similarly, in certain of the first through third embodiments of the invention, and aspects thereof, the analysis of intact or undegraded nucleic acids from giant cells and/or giant naked nuclei may further comprise the analysis of intact or undegraded nucleic acids from all cells captured by the size exclusion methodology in conjunction with the analysis of nucleic acids from a single giant cell, a group of giant cells, a single giant naked nuclei, a group of giant naked nuclei, or both giant cells and giant naked nuclei. Such cells included, but are not limited to CTCs, CECs, EMTs and cells not associated with cancer, such as white blood cells. In some aspects, the invention may further comprise analyzing all of the cells collected for epigenetic modifications, in addition to the analysis of nucleic acids from such cells.

In another embodiment, the invention comprises performing molecular analysis at different stages after collecting cells and/or naked nuclei, such as giant cells and/or giant naked nuclei, from a sample: (i) straight to molecular analysis, (ii) perform molecular analysis after cells were stained by fluorescent antibodies or by colorimetric stains, (iii) perform molecular analysis of cells mounted on microscope slides by mounting fluids and stored in 4° C. refrigerator. Similarly, in certain of the first through third embodiments of the invention, and aspects thereof, the analysis of intact or undegraded nucleic acids from cells and/or naked nuclei, such as giant cells and/or giant naked nuclei, may be performed (i) after collecting the cells and/or naked nuclei from a biological sample, (ii) after the collection in (i) and after the cells and/or naked nuclei are stained by fluorescent antibodies or a colorimetric stain, or (iii) after the collecting of (i) and optionally after the staining of (ii) and after the cells and/or naked nuclei are mounted on microscope slides and optionally stored at 4° C. In some aspects, the invention may further comprise analyzing the collected cells for epigenetic modifications, in addition to the analysis of nucleic acids from such cells.

In another embodiment, the invention comprises methods for early detection of cancer by obtaining cancer associated molecular changes obtained from intact nucleic acids obtained from cells and/or naked nuclei, such as giant cells and/or giant naked nuclei, in patient samples. Similarly, in certain of the first through third embodiments of the invention, and aspects thereof, when the analysis of intact or undegraded nucleic acids from cells and/or naked nuclei, such as giant cells and/or giant naked nuclei, reveals cancer-associated molecular changes in the nucleic acids, the subject is diagnosed with cancer. In some aspects, the invention may further comprise analyzing the cells for epigenetic modifications, in addition to the analysis of nucleic acids from such cells.

In another embodiment, the invention comprises methods for determining resistance to treatment of cancer by obtaining new cancer associated molecular changes obtained from collecting intact nucleic acids obtained from cells and/or naked nuclei, such as giant cells and/or giant naked nuclei, in patient samples. Similarly, in certain of the first through third embodiments of the invention, and aspects thereof, when the analysis of intact or undegraded nucleic acids from the cells and/or naked nuclei, such as giant cells and/or giant naked nuclei, reveals a second set of cancer-associated molecular changes in the nucleic acids that differ from a first set of cancer-associated molecular changes in the nucleic acids obtained from a similar biological sample collected from the subject prior to a cancer treatment, the subject is determined to be resistant to the cancer treatment. In some aspects, the invention may further comprise analyzing the cells for epigenetic modifications, in addition to the analysis of nucleic acids from such cells.

In another embodiment, the invention comprises methods for providing prognosis of cancer by obtaining the number of cancer associated molecular changes obtained from collecting intact nucleic acids obtained from cells and/or naked nuclei, such as giant cells and/or giant naked nuclei, in patient samples. Similarly, in certain of the first through third embodiments of the invention, and aspects thereof, the methods further comprise making a prognosis of cancer based on the number of cancer-associated molecular changes in the nucleic acids of the cells and/or naked nuclei, such as giant cells and/or giant naked nuclei. In some aspects, the invention may further comprise analyzing the cells for epigenetic modifications, in addition to the analysis of nucleic acids from such cells.

In another embodiment, the invention comprises methods for predicting treatment response of cancer by obtaining change of number of cancer associated molecular changes obtained from collecting intact nucleic acids obtained from cells and/or naked nuclei, such as giant cells and/or giant naked nuclei, in patient samples. Similarly, in certain of the first through third embodiments of the invention, and aspects thereof, a prediction of response of the subject to a cancer treatment is made when a change in the number of cancer-associated molecular changes in the nucleic acids is detected between nucleic acids from a first sample of cells and/or naked nuclei, such as giant cells and/or giant naked nuclei, and nucleic acids from a second set of cells and/or naked nuclei. In certain aspects, the subject is subjected to a cancer treatment between the time points when the first and second samples of cells and/or naked nuclei are obtained from the subject. In some aspects, the invention may further comprise analyzing the cells for epigenetic modifications, in addition to the analysis of nucleic acids from such cells.

In another embodiment, the invention comprises methods for detecting residual cancer by determining the presence of previous known cancer associated molecular changes obtained from collecting intact nucleic acids obtained from cells and/or naked nuclei, such as giant cells and/or giant naked nuclei, in patient samples. Similarly, in certain of the first through third embodiments of the invention, and aspects thereof, residual cancer is detected in the subject when the identity of a set of cancer-associated molecular changes in the nucleic acids from a sample of cells and/or naked nuclei, such as giant cells and/or giant naked nuclei, is found to be the same as the identity of a set of cancer-associated molecular changes in the nucleic acids of a sample of cells and/or naked nuclei, such as giant cells and/or giant naked nuclei, obtained earlier in time from a similar biological sample from the subject. In certain aspects, the subject is subjected to a cancer treatment between the time points when the first and second samples of cells and/or naked nuclei are obtained from the subject. In some aspects, the invention may further comprise analyzing the cells for epigenetic modifications, in addition to the analysis of nucleic acids from such cells.

In another embodiment, the invention comprises methods for detecting cancer recurrence by determining recurrence of presence of previous known cancer associated molecular changes obtained from collecting intact nucleic acids obtained from cells and/or naked nuclei, such as giant cells and/or giant naked nuclei, in patient samples. Similarly, in certain of the first through third embodiments of the invention, and aspects thereof, cancer recurrence is detected in the subject when the identity of a set of cancer-associated molecular changes in the nucleic acids from a sample of cells and/or naked nuclei, such as giant cells and/or giant naked nuclei, is found to be the same as the identity of a set of cancer-associated molecular changes in the nucleic acids of a sample of cells and/or naked nuclei, such as giant cells and/or giant naked nuclei, obtained earlier in time from a similar biological sample from the subject. In certain aspects, the subject is subjected to a cancer treatment between the time points when the first and second samples of cells and/or naked nuclei are obtained from the subject. In some aspects, the invention may further comprise analyzing the cells for epigenetic modifications, in addition to the analysis of nucleic acids from such cells.

In another embodiment, the invention comprises methods for determining new cancer in cancer patients in remission by obtaining new cancer associated molecular changes obtained from collecting intact nucleic acids obtained from cells and/or naked nuclei, such as giant cells and/or giant naked nuclei, in patient samples. Similarly, in certain of the first through third embodiments of the invention, and aspects thereof, the subject may be a cancer patients in remission and the set of cancer-associated molecular changes are different than the set of cancer-associated molecular changes corresponding to the cancer for which the subject is in remission. In some aspects, the invention may further comprise analyzing the cells for epigenetic modifications, in addition to the analysis of nucleic acids from such cells.

In another embodiment, the invention comprises methods for detecting treatable premalignant conditions by obtaining cancer associated molecular changes information obtained from collecting intact nucleic acids obtained from cells and/or naked nuclei, such as giant cells and/or giant naked nuclei, in patient samples. Similarly, in certain of the first through third embodiments of the invention, and aspects thereof, the cancer is a treatable premalignant condition. In some aspects, the invention may further comprise analyzing the cells for epigenetic modifications, in addition to the analysis of nucleic acids from such cells.

Giant cells and giant naked nuclei can be used to evaluate a single molecular change, or for a large number of molecular changes for cancer patients. In each of the first through third embodiments of the invention, and aspects thereof, the cancer-associated molecular changes can be a single molecular change, 2-5, 6-10, 11-15, 16-20, or more molecular changes.

Giant cells and giant naked nuclei can be picked out individually for molecular analysis. In each of the first through third embodiments of the invention, and aspects thereof, the analysis may be conducted on a single giant cell or single giant naked nuclei.

All the giant cells and giant naked nuclei on the filter can be analyzed for molecular changes at the same time. In each of the first through third embodiments of the invention, and aspects thereof, the analysis may be conducted each of the giant cells or each of the giant naked nuclei in a sample.

Molecular analysis of the cancer can be obtained in real time (sequential time points) by analyzing giant cells and giant naked nuclei. In each of the first through third embodiments of the invention, and aspects thereof, the analysis may be repeated on two or more similar biological samples from the subject.

The molecular changes detected in the giant cells and giant naked nuclei can be used as the basis for treatment decisions if there are drugs suitable to treat the cancer. Similarly, in certain of the first through third embodiments of the invention, and aspects thereof, the methods further comprise making treatment decisions for the subject based on the results of the analysis.

Giant cells have been found in the blood of active viral infections. Sequencing of giant cells for these patients can provide information about viral activity and patient condition. Similarly, in certain of the first through third embodiments of the invention, and aspects thereof, the methods further comprise detecting and/or sequencing viral nucleic acids in the giant cells and/or giant naked nuclei.

Giant cells have also been found in blood of sepsis patients. Molecular assays or sequencing can provide a variety of information about infection. Similarly, in certain of the first through third embodiments of the invention, and aspects thereof, the methods further comprise detecting and/or sequencing bacterial nucleic acids in the giant cells and/or giant naked nuclei.

DETAILED DESCRIPTION OF THE INVENTION

Definitions

Figure 1:
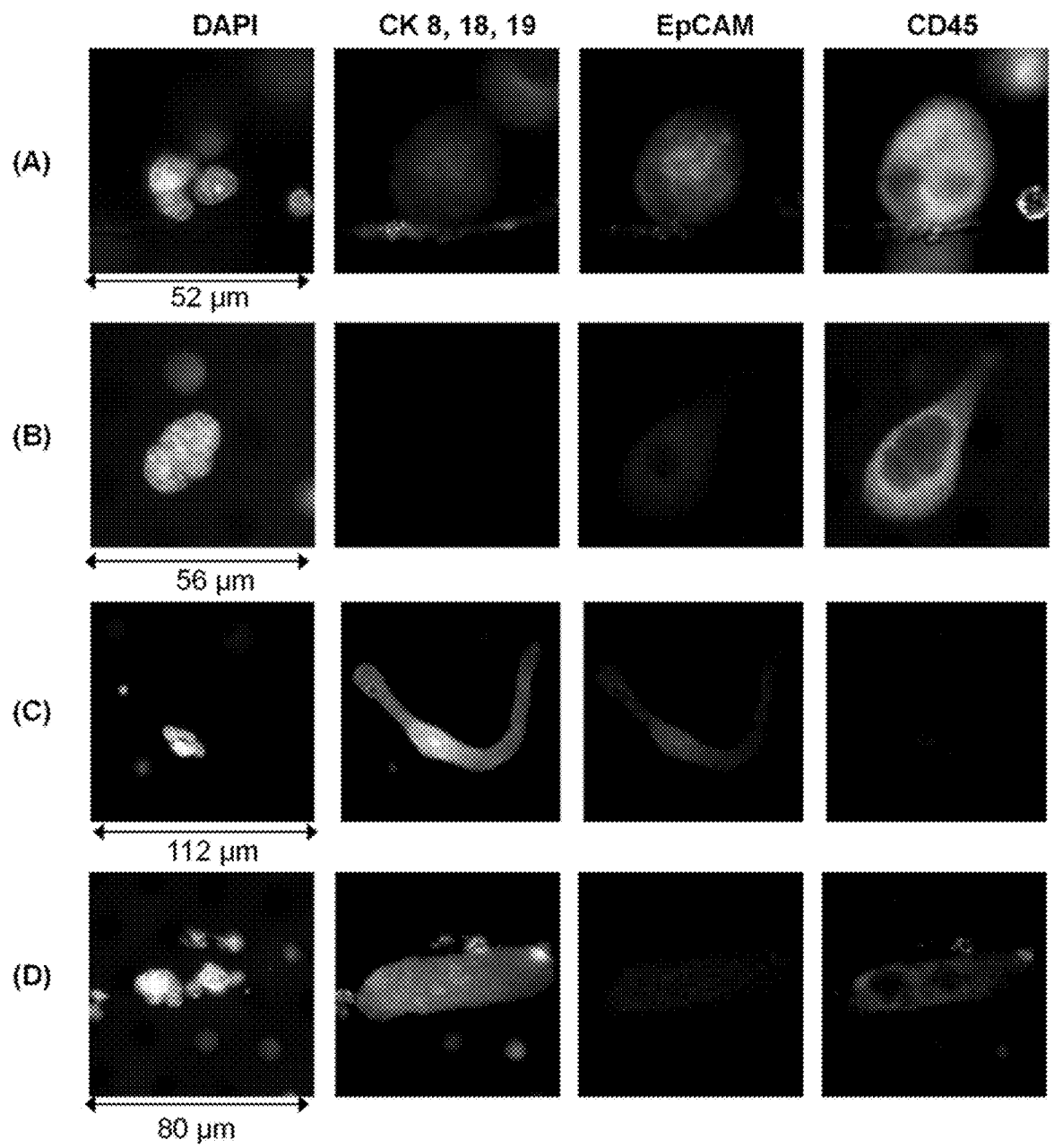
FIG. 1 shows images of four different CAMLs (A-D) with different cytoplasm morphologies showing the nuclei and the cytoplasm.

As used herein, the term "molecular changes" means one or more mutations in a nucleic acid and one or more epigenetic modifications.

As used herein, the term "mutation" means the permanent alteration of the nucleotide sequence of the genome of a subject. The mutations can be one or more of amplifications, substitutions, insertions, deletions, fusions, translocations, chromosomal inversions, loss of heterosyzosity, and combinations thereof.

As used herein, the term "epigenetic modification" means the DNA methylation, histone modification, and combinations thereof.

The molecular techniques and methods that can be used to analyze the mutations of nucleic acids discussed herein, including those from giant cells and giant naked nuclei, include nucleic acid sequencing, PCR, expression cloning, gel electrophoresis, DNA microarrays, DNA chips, microsatellite enrichment, western blot, FISH, and ddPCR, and other suitable techniques and methods that will be known to the skilled artisan. Additional techniques and methods that pertain to analysis of epigenetic changes include restriction endonucleases, bisulfite sequencing, single molecule real time sequencing, and other suitable techniques and methods that will be known to the skilled artisan.

Circulating CAMLs are cancer-related stromal cell that are found in the blood of subjects that have cancer. The term "cancer associated macrophage-like cells (CAMLs)" denotes polyploid giant cells in the blood of cancer patients. CAMLs are typically 25-300 μm in size. CAMLs engulf tumor cells and tumor debris, so they contain nuclear acids that encode the cancer mutations and/or exhibit epigenetic modifications. They are poly-nucleated, because they engulfed tumor cells. CAMLs contains more nuclei than a single tumor cell. CAMLs are associated with all solid tumors tested and all stages of cancer. Because of their size, CAMLs are also referred to as giant herein. CAMLs can be either CD45(−) or CD45(+), and they can express CD11c, CD14 and CD31, which confirms their origin as a myeloid lineage. They are often found in the process of engulfing circulating tumor cells (CTCs) and cell debris [1-7]. Unlike ctDNA, each CAML provides not only high quality nucleic acids, but also multiple copies of individual nucleic acids.

As used herein, the term "giant cell" refers to CAMLs. They are larger than red and white blood cells. A number of diseases produce giant cells in the blood of patients. CAMLs are giant cells that are found in the blood of solid tumor patients.

As used herein, the term "naked nuclei" refers to nuclei that are isolated and separate from a cell. As used herein, the term "giant naked nuclei" refers to nuclei that are isolated and separate from giant cells. Giant naked nuclei are larger than the nucleus of a single CTC without a cytoplasm. Giant naked nuclei range from 10-70 μm in size. Giant naked nuclei extruded from CAMLs are also found in high frequency in the blood of cancer patients. Naked nuclei, regardless of the cells from which they are isolated include both naked nuclei found in biological samples isolated from a subject, such as blood, and are thus naturally occurring, as well as naked nuclei prepared from cells in vitro.

As used herein, the term "ctDNA" denotes circulating tumor DNA. ctDNA is tumor-derived fragmented DNA in the bloodstream that is not associated with cells. ctDNA should not be confused with cell-free DNA (cfDNA), a broader term which describes DNA that is freely circulating in the bloodstream, but is not necessarily of tumor origin. cfDNA includes both normal DNA and ctDNA. Blood tests that can provide the same diagnostic information as tissue biopsies are sought. Collection of blood is potentially more convenient, presents lower risk, and can be conducted at lower cost than tissue biopsy. Blood can be collected on a serial basis. It is hoped that ctDNA can fill this role and provide many clinical utilities. As mentioned before, currently ctDNA's applications are limited. The main reason is that the amount of ctDNA among cfDNA is limited and ctDNA is typically fragmented.

As used herein, the term "analyte" refers to any substance or chemical constituent that is subject to analysis.

As used herein, the term "analyte capture element" refers to a binding moiety that recognizes the analyte and binds to the analyte. Analyte capture elements can be antibodies, antibiotics, an antigen target for an antibody analyte, cell receptor protein, avidin, NEUTRAVIDIN® avidin, biotin, nuclear acid or related to nucleic acid (e.g., oligonucleotide, in situ hybridization, DNA, cDNA, microRNAs, mRNA and RNA), riboprobes, polysaccharide, monosaccharide, oligosaccharide, Poly-L-lysine, Polymyxin B, Daunomycin, Acridine, Spermine, aptamers, VECTABOND™ tissue section adhesion reagent, amino-ccyl silane, SUPERFROST PLUS™ microscope slides, Maple's, NaOH/Poly-L-lysine, bozymes, enzymes, ligands, cell and cell fragment as well as other biological particles.

As used herein, the terms "sample", "biological sample" and "patient sample" are synonymous and intended to mean a sample that may contain cells or nucleic acids and that is obtained from a subject. Such samples are predominantly in liquid form. The most useful patient sample is blood, but suitable samples also include lymphatic tissue, lymphatic circulation, serum, bone marrow, urine, saliva, amniotic fluid, bile, sputum, ascites, pleural effusion, cervical vaginal fluid, ovarian cyst fluid, endometrial fluid, uterine lavage fluid, lymphedema, and cerebral spinal fluid, and other body fluids that contain, or might contain, cells such as giant cells and/or nucleic acids, such as giant naked nuclei. The sample can also be growth media spiked with proliferating cells, such as giant cells. Suitable sample volumes to an analyzed using the methods of the invention will be governed by the identity of the sample the method being practiced, and the means used to practice the method. However, when the sample is blood, suitable volumes will generally range from 1 to 100 ml. In one aspect, the volume will range from 3 to 50 ml. Specific suitable volumes include, but are not limited to, 1, 1.5, 2, 2.5, 3, 3.5, 4, 4.5, 5, 5.5, 6, 6.5, 7, 7.5, 8, 8.5, 9, 9.5, 10 ml or more.

As used herein, the term "subject" refers to a mammal, such as, but not limited to, a human, ape, dog, cat, horse, cow, sheep or fish. As used herein, the term "patient" refers to a subject having cancer, a subject having previously had cancer, such as a subject in remission, or a subject suspected of having cancer that has not yet been diagnosed with cancer.

Currently there is a desire to identify analytes in the blood that consistently emanate from tumor sites and that can be used in the analysis of molecular changes of tumors, and for methods to collect such analytes. The current, widely adopted method to obtain mutation information from blood for cancer screening and diagnostic applications is to use ctDNA, which has many limitations. Changes in DNA methylation (i.e., epigenetic modifications) have also been used to detect cancer in blood and stool. CTCs have been widely used to perform PCR and mutation analysis, but CTCs are primarily found in late stages of breast, prostate and colorectal cancers, but not in early stages of the same cancer, and rarely found in other solid tumors. In all cases, mutations associated with the stromal cells are not part of the analysis.

Thus, the ability to easily and reproducibly analyze molecular changes to cancer cell-associated nucleic acids, especially over time, could serve as the basis for new methods of cancer screening, diagnostics, treatment, and recurrence. The present invention is directed to such ends. In particular, described herein is the use of nucleic acids from giant cells and giant naked nuclei from body fluids in methods associated with cancer screening, diagnostics, treatment, and recurrence.

Giant cells (e.g., CAMLs) identified by Daniel Adams [1-7] are known to emanate from primary tumor sites and exist primarily as a result of cancer presence. Giant cells are known to engulf proteins, nucleic acids and whole intact tumor cells. They have large quantities of tumor specific markers which have been described as matching the primary tumor markers. Purifying and identifying molecular changes in giant cells can be applied for determining prognosis and for predictive drug treatment.

FIGS. 1A-1D show four typical CAMLs. They are much larger than red and white blood cells and CTCs. They have different morphologies, but they all have polyploid nuclei, with one or more enlarged fused nuclei and/or scattered individual nuclei. The size of fused nuclei can be 10 to ~70 µm in size. Marker expression on the CAML can vary depending on the cancer and patient.

Figure 2:
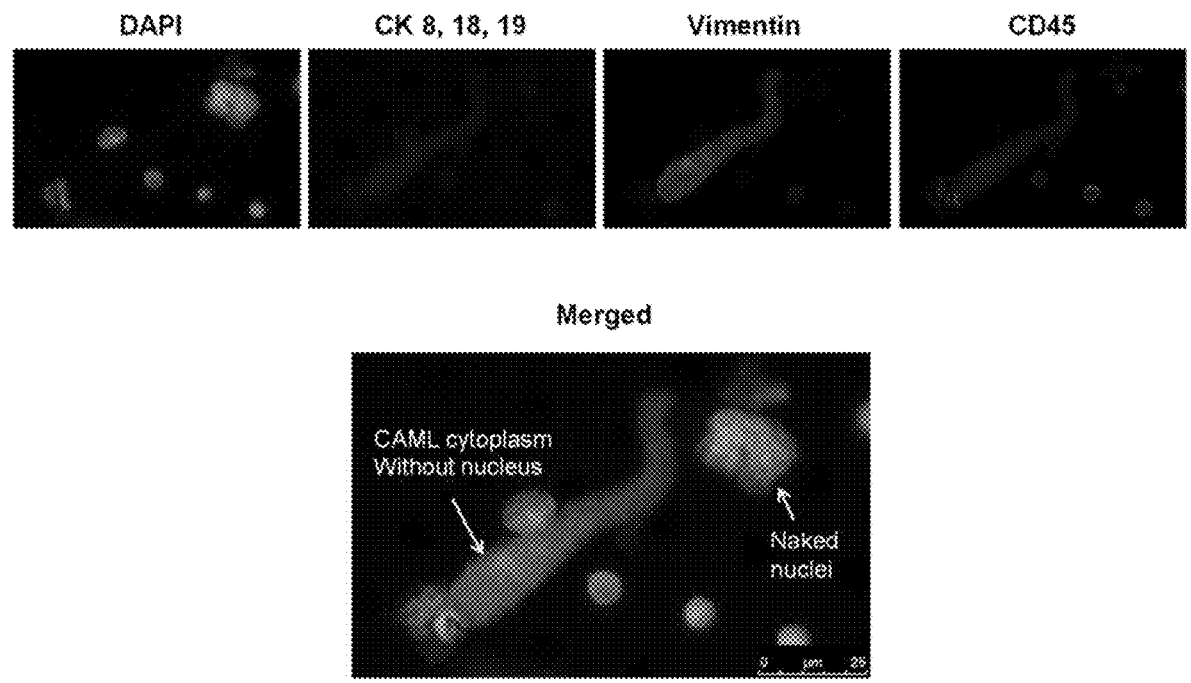
FIG. 2 show images of CAML cytoplasm lost the nuclei, and the extruded nuclei located next to it.

FIG. 2 shows that occasionally, the nuclei of the CAML can be extrude. FIG. 2 shows a CAML with only cytoplasm and a large naked nuclei next to each other [4], an uncommon observation with both in the same image. However, the naked nuclei is commonly found when CAMLs are found. FIGS. 3A-3B show that some cytoplasm are around the surface of the nuclei, but not enough to identify them as cells.

Figure 3:
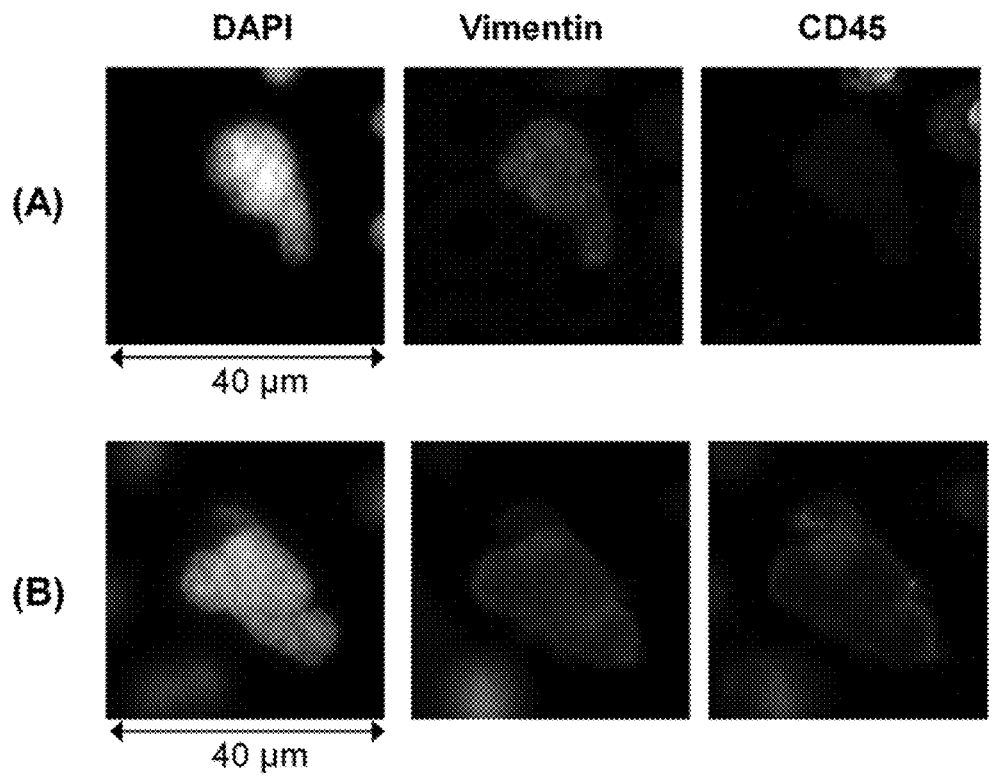
FIG. 3 shows images of two different large naked nuclei (A-B) with a little cytoplasm on the surface of the nuclei.
Figure 4:
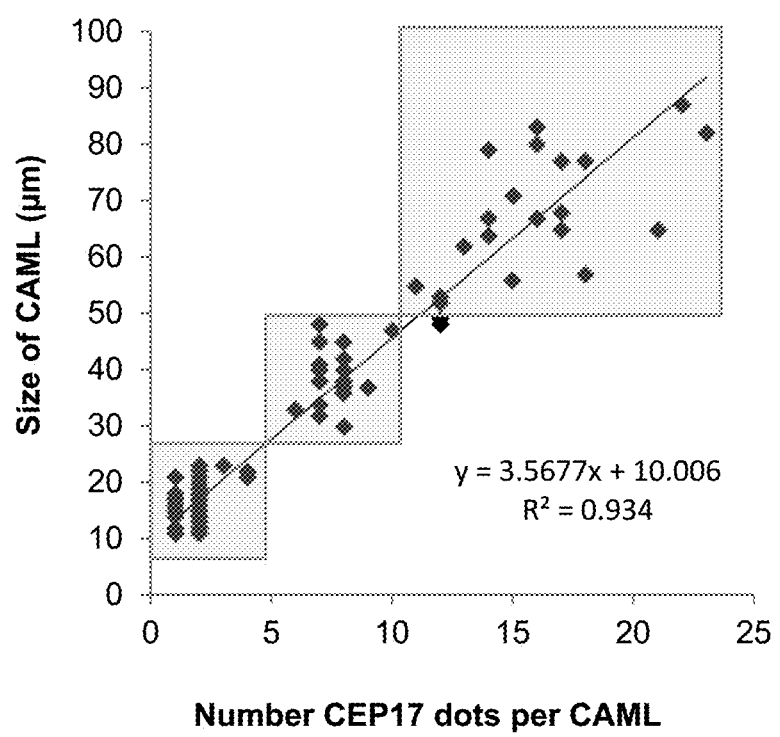
FIG. 4 shows the relationship between CAML size and the number of CEP17 dots per cell.

FIGS. 1-3 suggests that large nuclei in CAMLs are related to contain DNA from more than one cell. The CAMLs are evaluated for number of chromosome probe 17 (CEP17) dots, an indicator of number of nuclei engulfed. FIG. 4 is a plot of CAML size versus CEP17, indicating that the large CAMLs got DNA from many cells. FIG. 4 shows that CAMLs>50 µm in size have more CEP17 dots than CAMLs of between 25-50 µm in size.

As described above, the present invention provides nucleic acids from CAMLs, containing many copies of intact nuclear DNA, for analysis via blood test for all the major solid tumors in all stages of cancer even high percentage of times in Stage I and premalignant conditions. The invention also provides for RNA and epigenetic analysis of the nucleic acids. Described herein are methods to collect sufficient amounts of nucleic acids for DNA, RNA, and epigenetic for analysis. Also described herein are clinical applications based on the nuclear material.

CAMLs are ideal for real time molecular analysis for cancer patients. CAMLs were found in the blood of all 16 solid tumor cancers evaluated to date: breast, prostate, pancreatic, non-small cell lung cancer (NSCLC), sarcoma, kidney, bladder, colorectal, uterine sarcoma, neuroblastoma, esophageal, ovarian, melanoma, and liver. Thus, the cancers mentioned in association with each of the methods of the invention include one or more of these cancers. CAMLs are expected to also be found in association with other solid tumors. CAMLs are found in all stages of cancer, even stage I in high percentages in 7.5 mL of blood. CAMLs can be isolated by collecting blood, for example 3-50 mL, and 50 mL is an acceptable volume from which to isolate the cells. Single CAML cells may be sequenced with accuracy because they are polyploid.

Late stage breast, prostate and colorectal cancer patients often has circulating tumor cells (CTCs), CTCs has single nucleus unless it is in mitosis [8-17]. CTC clusters are sometime found in stage IV patients in these three types of cancer. CTCs are not common in early stages and not common in other types of solid tumors.

Epithelial Mesenchymal Transition (EMT) cell found often, and usually in clusters in the blood of cancer patients. EMTs possess cancer markers and cancer DNA.

Cancer Associated Vascular Endothelial cells (CAVEs), a subtype of circulating endothelial cells (CECs), also have the same mutations associated with cancer [16].

Methods

Size exclusion methodologies that remove all red blood cells and the majority of white blood cells and retain cells larger than 8 microns are suitable means for collecting giant cells and giant naked nuclei. There are many suitable size exclusion methods. If the sole purpose is to obtain nucleic acids, then the type of size exclusion method is not critical as long as the method does not lose some giant cells or giant naked nuclei. Thus, the size exclusion methodologies used in the methods of the invention are those that generally retain cells larger than 5 microns in size. Specific size exclusion methodologies used in the methods of the invention are those that retain cells larger than 5, 6, 7, 8, 9, 10, 11, 12, 13, 14, 15 or more microns in size.

If it is also desired to obtain marker information, cell counts and size measurement information of the giant cells isolated from the patient sample before cell lysis and nucleic acid analysis, then the use of filtration technology to capture the giant cells is the preferred size exclusion platform. The patient sample passes through the filter. Large cells are captured on the filter while most white blood cells (WBCs) and red blood cells (RBCs) pass through the pores of the filter.

Giant cells, giant naked nuclei and other cells such as CTCs, EMTs, CAVEs, and cell clusters all can be retained on the filter and then visualized and counted. Staining intensity can be measured and sizes determined when the cells are stained with fluorescent conjugated antibodies targeting markers of CAML or stained with colorimetric stains. The filter can be mounted on a microscope slide and cells can be images. The filter on the slide can also be stored in 4° C. for later analysis.

Some size exclusion methods release captured cells into solution. Some methods retain the cells on a filter or on a chip. If giant cell features do not need to be determined, the cells can be lysed for nucleic acid analysis immediately after capture.

A more detailed description of a filtration technique for blood that needs cell information consisting of the follow steps. The process starts by placing a filter in a filter holder. A biological sample from a subject, such as blood, is collected, such as in CellSave tubes when blood is the sample. The blood is pre-fixed in a mild prefixation buffer to make the cells slightly more rigid to prevent the cells from squeezing through the pores of the filter or lysing. The prefixed blood is passed through the filter by negative pressure again to reduce cell lysis. The cells are washed on the filter using PBS. If cell information is not needed, the cell lysis can be performed immediately and the nucleic acids then subjected to molecular analysis for mutations and/or epigenetic modifications.

If cell information are needed, post-fixation may be performed followed by washing with PBS. The cell membranes can be subjected to permeabilization, followed by washing with PBS. Cell staining can be conducted, followed by additional washing. The filter can be mounted on a glass slide with mounting fluid and cover slip. The cells can then be imaged on the filter. After imaging, the cells can be stored at 4° C. to be lysed anytime within a few years for molecular analysis.

Giant cells can also be collected by filtration directly from the subject using the device described and shown in FIG. 28 of international patent application publication number WO 13/078409, entitled "Polymer microfiltration devices, method of manufacturing the same and the uses of the microfiltration devices". Molecular analysis of the giant cells can be performed right after cell capture or after staining with antibodies.

The giant cell can also be collected by red blood cell lysis. However, care must be taken because the number of WBCs may overwhelm the number of giant cells and giant naked nuclei in the sample.

The giant cells can also be obtained by white blood cell depletion. However, again care must be taken as such depletion may cause the loss of some giant cells.

The giant cells can also be collected by analyte capture elements (defined above) targeting markers on the cell surface, such as CD14, CD31 and/or other markers in the case of giant cells. The capture elements, such as antibodies, can be coated on magnetic beads, magnetic nanoparticles, and any variety of other particles. The particles are mixed with the sample. Collecting the particles will concentrate the giant cells. This technique is particularly suited for isolation of cells from a sample and then direct molecular analysis of the nucleic acids of the cells, in the absence of otherwise characterizing the cells. This method does not capture giant naked nuclei.

The analyte capture elements can be coated on surfaces, columns and other structures. The sample flows over the capture element-coated surface or around the columns or structure.

As suggested above, the molecular analysis of cells and/or naked nuclei can be performed on a single cell, or multiple cells, a single naked nuclei or multiple naked nuclei. The cells are typically giant cells but can include WBCs, CTCs, CAVES, EMTs and others because certain capture methodologies will ensnare cells in addition to giant cells. While these cells might be considered to be 'contaminating' cells as such cells may not include mutations and epigenetic modifications that are being sought, which will be the case with WBCs, their presence in a sample will not typically interfere with the molecular analysis of the nucleic acids from the giant cells. Similarly, the naked nucleic are typically from giant cells, but can be from other cells as well, such as WBCs, CTCs, CAVES, EMTs and others.

The giant cell may include within it nucleic acids, mitochondrial DNA, proteins, bacteria, viruses, spores, oocysts, cells, cell fragments, receptors, oligonucleotides, antibodies, enzymes, antibiotics, peptides, carbohydrates, hormones, toxins, disease markers, DNA, cDNA, miRNA, mRNA, RNA, natural organic compounds, synthetic organic compounds such as pesticides, pharmaceuticals, food additives, dyes, and inorganic compounds depending on the cancer.

Giant cells can be captured and cultured to expand the analyte. Giant cell proliferation has been found which amplifies the tumor molecular changes within the giant cells. Some virus, bacteria, and other pathogens can proliferate within the giant cells as the giant cells grow in culture which may also be of interest.

Tools

The invention of the tools to allow the methods described above are filters of varying size uncoated or coated with capture analyte recognition element(s) through which a sample pass using syringe, pump, vacuum suction, implemented manually, semi manually, or by an automated instrument.

EXAMPLES

An experiment was conducted to detect molecular changes in the nucleic acids of giant cells isolated from the blood of 9 cancer patients, including 3 colon, 3 breast and 3 lung cancers. Giant cells were collected and lysed, and nucleic acids are sequenced for cancer mutations. Additionally giant cell nucleic acids from 3 patients were analyzed temporally at 2 time points to determine the stability of the mutations identified. Whole blood was prefixed, and filtered. After filtration, the cells on the filter were post fixed, permeabilized and stained for the biomarker DAPI, CD45 and cytokeratin to confirm the identity of the giant cells.

Experiment 1—Filtered samples from 9 patients with giant cells were subjected to lysis and nucleic acids were analyzed against a 50 gene oncology panel (Table 1). Cancer mutations were found in each of the 9 samples tested.

Experiment 2—Three patients had blood taken at 2 time points (3-4 week apart), giant cells were lysed, nucleic acids were analyzed against a 50 gene panel (Table 1) and the mutations compared. The same mutations were found in the same patient samples at both time points.

Detailed experimental procedures are as follows. A 7.5 mL sample of whole blood was mixed 1:1 with prefixation buffer and incubated for 15 minutes. A CELLSIEVE™ filter (Creaty MicroTech, Potomac, MD) was placed into a filter holder and washed with 5 ml PBS. Blood was filtered through the filter over 3 minutes and the filter was washed with 5 mL PBS. The cells on the CELLSIEVE™ filter were post-fixed followed by washing. The cells on the CELLSIEVE™ filter were pemeabilized followed by washing. An antibody solution containing anti-CD45 and cytokeratins 8, 18, and 19 was added and incubated for 1 hour. The filter was washed with 10 ml PBST, placed on a microscope slide and mounted with DAPI and Fluoromount. The filter was analyzed for giant cells (>25 micron in size) with an enlarged, often polyploidy, nuclear structure. Cells were lysed with microbeads, see below.

Detection of mutations post analyte capture can take various formats.

To perform nucleic acid analysis following cell capture, the cell can be lysed directly on the filter. There are a number of protocols for the extraction of nucleic acids from cells or pathogens. The following is a description using BIOSTIC™ Bacteremia DNA Isolation Kit (MO Bio Laboratories, Inc.) with a slightly modified protocol using the filter placed within the MicroBead Tubes. The protocol consists of the following 1. Add the filter and "Cell Lysis/Inhibitor Solution" to the microbead tube, heat and vortex sample to release DNA.
2. Remove the supernatant and analyze the DNA.

The DNA from (i) giant (CAML) cell lysates and (ii) plasma was sequenced, and the findings were compared. As indicated above, three of the samples were from sequential time points of the same patient (Colon-04B and Colon-04C; B6A and B6B; NSCLC 12B and NSCLC 12C). The samples were blinded to the sequencing company. The sequencing was based on a 50 gene panel shown in Table 1.

TABLE 1

| 50 gene oncology panel | | | | |
|---|---|---|---|---|
| ABL1 | IDH2 | FGFR1 | PTEN | EGFR |
| AKT1 | JAK2 | FGFR2 | RB1 | ERBB2 |
| ALK | JAK3 | FGFR3 | RET | ERBB4 |
| APC | KDR | FLT3 | SMAD4 | EZH2 |
| ATM | KIT | GNA11 | SMARCB1 | FBXW7 |
| BRAF | KRAS | GNAQ | SMO | NPM1 |
| CDH1 | MET | GNAS | SRC | NRAS |
| CDKN2A | MLH1 | HNF1A | STK11 | PDGFRA |
| CSF1R | MPL | HRAS | TP53 | PIK3CA |
| CTNNB1 | NOTCH1 | IDH1 | VHL | PTPN11 |

The results are shown in Table 2, where the mutant allele fraction is shown in parentheses. Identical mutations found in sequential samples from the same patient are an indication of accuracy. This was the case for CAMLs (Table 2: bold and underlined). These results confirmed that CAMLs provide an adequate quantity of DNA for mutational analysis. There were only few cases where mutation in ctDNA in plasma and CAMLs were in agreement (Table 2: bolded, underlined and in italics). These results indicate that CAMLs are a more reliable source of DNA for mutation analysis than ctDNA in plasma for this purpose.

TABLE 2

Sequencing CAMLs and plasma

| Patient Identification Number | Number of CAMLs | Mutation found in CAMLs | Mutation found in Plasma Sample (ctDNA) |
|---|---|---|---|
| Colon -04B | 80 | KDR Q472H(45.0%); <br> TP53 P72R (75.4%) <br> PIK3CA I391M(53.6%) | PIK3CA H1047R (6.0%); <br> TP53 C238R (3.4%) |
| Colon -04C | 12 | KDR Q472H(54.7%); <br> TP53 P72R (61.0%) <br> PIK3CA I391M(53.6%) | TP53 I255T (2.8%); <br> TP53 K351* (100%) |
| Colon - 1B | 18 | PIK3CA I391M (58.1%); <br> PTPN11 E69K (1.9%) | No mutation detected |
| Colon - 2A | 8 | FBXW7 p.R473fs; c.1417delA (32.1%) <br> KIT p.M541L; c.1621A>C (26.2%) <br> ATM p.T2666A; c.7996A > G (7.8%) <br> ATM p.N3003D; c.9007A > G (3.7%) | KIT p.M541L; c.1621A>C (28.3%) <br> PTEN p.L57S; c.170T > C (2.1%) |
| Breast - 2D | 13 | PIK3CA I391M (64.6%) | No mutation detected |
| Breast - 4C | 3 | TP53 R249G (2.4%); <br> TP53 P72R (93.9%); <br> KDR Q472H (43.1%) <br> APC E1374* (6.8%); <br> BRAF A598V (5.2%) | KDR Q472H (43.1%) |
| Breast - 6A | 5 | TP53 P72R (45.9%) <br> EGFR C775Y (13.2%); <br> PIK3CA I391M(70.6%) <br> PIK3CA K111R (2.5%); <br> CTNNB1 G38D (4.0%); <br> KRAS A18D (3.1%) | TP53 P72R (45.9%) <br> IDH1 R132H (11.3%) |
| Breast - 6B | 13 | TP53 P72R (45.9%); <br> TP53 R273H (2.5%); <br> TP53 Y234* (2.4%); <br> PIK3CA I391M(70.6%) <br> RET C634R (4.3%) | No mutation detected |
| NSCLC 12B | 2 | TP53 p.P72R c.215C > G (Exon 4) (94.9%) | N/A |
| NSCLC 12C | 2 | TP53 p.V216A; c.647T > C (Exon 6) (5.2%) <br> TP53 p.P72R; c.215C >G(Exon 4) (95.4%) | TP53 p.G244S; c.730G > A (Exon 7) (5.1%) <br> TP53 p.I232T; c.695T > C (Exon 7) (2.9%) <br> TP53 p.C242R; c.724T > C (Exon 7) (2.0%) <br> NOTCH1 p.V1578del; c.4732_4734delGTG (2.8%) <br> VHL p.L128P; c.383T > C (2.0%) |
| NSCLC 13A | 4 | PIK3CA p.E542G; c.1625A > G (45.5%); <br> ERBB4 p.N181S; c.542A > G (4.7%) | PIK3CA p.T1025A; c.3073A > G 2.8% |
| NSCLC- 11B | 5 | TP53 P72R (61.0%); <br> ERBB2 L755S (1.9%) | TP53 P72R (94.2%); |

Currently, the data are obtained using two or more CAMLs but no CTCs on the filter. The good correlation results of samples NSCLC 12B and 12C used two CAMLs. This indicates that one CAML can also provide accurate results.

The data in Table 2 was obtained by lysing all the cells on the filter. The background produced from the white blood cells on the filter did not affect accuracy.

Sequencing of CAMLs, ctDNA, and Tumor Tissue

In another experiment into detecting cancer mutations, giant cells were isolated from the blood of 3 cancer patients and subjected to the analysis described above. The mutations discovered were compared with mutations found in the corresponding primary tumor biopsies. In particular, lung biopsies from 3 lung cancer patients were screened with a 50 gene mutation panel (Table 1). Giant cells and plasma were isolated from the same 3 lung cancer patients prior to start of treatment. Plasma from the blood samples were removed prior to running blood samples for CAMLs and sequenced separately. After plasma removal, whole blood was prefixed, filtered. After filtration, the cells on the filter were post fixed, permeabilized and stained for the biomarker DAPI, CD45 and cytokeratin to confirm the identity of the giant cells. Giant cells were lysed and sequenced.

TABLE 3

Sequencing primary biopsy, CAMLs, and plasma

| Patient ID Number | Number of CAMLs | Mutation found in Primary Biopsy | Mutation found in CAMLs | Mutation found in Plasma Sample (ctDNA) |
|---|---|---|---|---|
| Lung 15 | 5 | TP53 c.832C > A p.P278T; <br> HNF1A: c.619G > T p.G207C | ATM R337C (6.2%), <br> PIK3CA H1047R (2.2%), <br> PIK3CA I391M (43.8%), | EGFR P596L (3.5%) |

TABLE 3-continued

Sequencing primary biopsy, CAMLs, and plasma

| Patient ID Number | Number of CAMLs | Mutation found in Primary Biopsy | Mutation found in CAMLs | Mutation found in Plasma Sample (ctDNA) |
|---|---|---|---|---|
| Lung 323 | 6 | EGFR: c.2235-c.2249 del 15 p. p.E746-p.A250 del | PTEN Y174* (5.3%), RET C634R (2.3%), TP53(P278A 6.3%), TP53 V272M (2.3%), TP53 c.376-2A > G (2.2% CDH1 D402N (3.3%), RB1 R661W (3.1%), SMAD4 F339S (7.3%) | None |
| Lung 329 | 2 | TP53: c.673-2A > G | KDR Q472H (9.6%) FGFR2 I381V (5.9%), PDGFRA G829E (4.3%), PTEN R15G (18.5% | ABL1 (A426V 5.2%), KDR (Q472H 43.1%) KIT (K818R 2.7%), TP53 (L194P 4.4%) |

The results are shown in Table 3, where the mutant allele fraction is shown in parentheses and mutations from biopsies are not assessed for frequency. An example of identical mutations found in both biopsy and in CAML lysates were found in patient Lung 15 (Table 3: bold and underlined). These results confirmed that CAMLs provide an adequate quantity of DNA for mutational analysis that can match the mutations found in tumors from the same patient. There were cases where mutation in ctDNA in plasma and CAMLs were in agreement (Table 2 and Table 3: bolded and in italics). These results indicate that CAMLs are a reliable source of DNA for mutation analysis that can correspond to mutations from tumor biopsies and/or mutation analysis that can correspond to mutations from plasma.

Mutation Analysis and Patient Information

Data obtained in earlier experiments demonstrated that CAML size has important prognostic information. If the largest CAML found in 7.5 ml of peripheral blood is larger than 50 μm, the overall survival (OS) is short and progression free survival (PFS) is much shorter than if the largest CAML found is smaller than 50 μm.

Figure 5A:
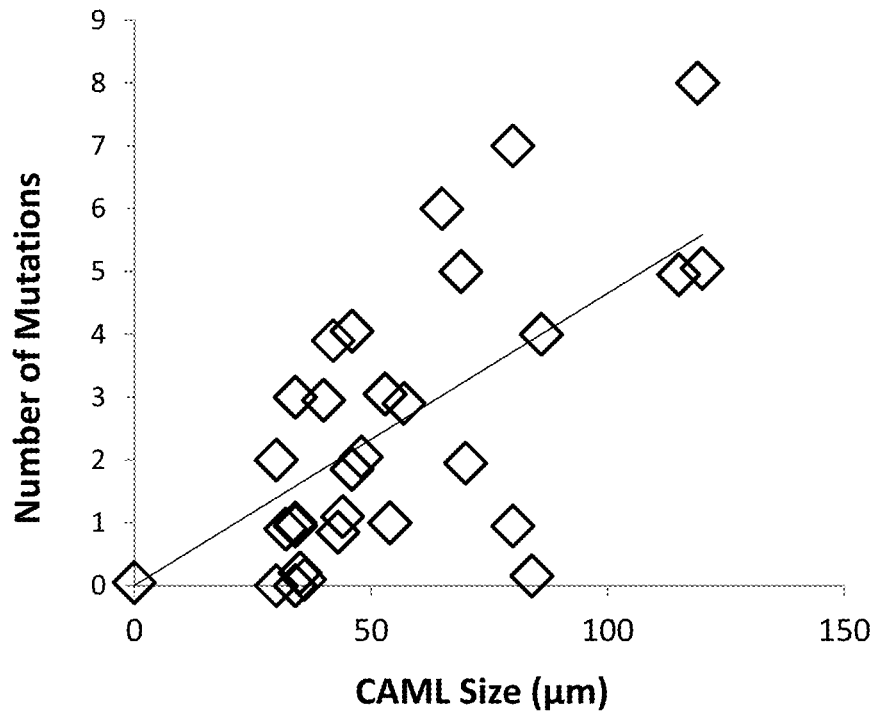
FIGS. 5A-B are two different methods to plot number of mutations versus CAML size for the same data.
Figure 5B:
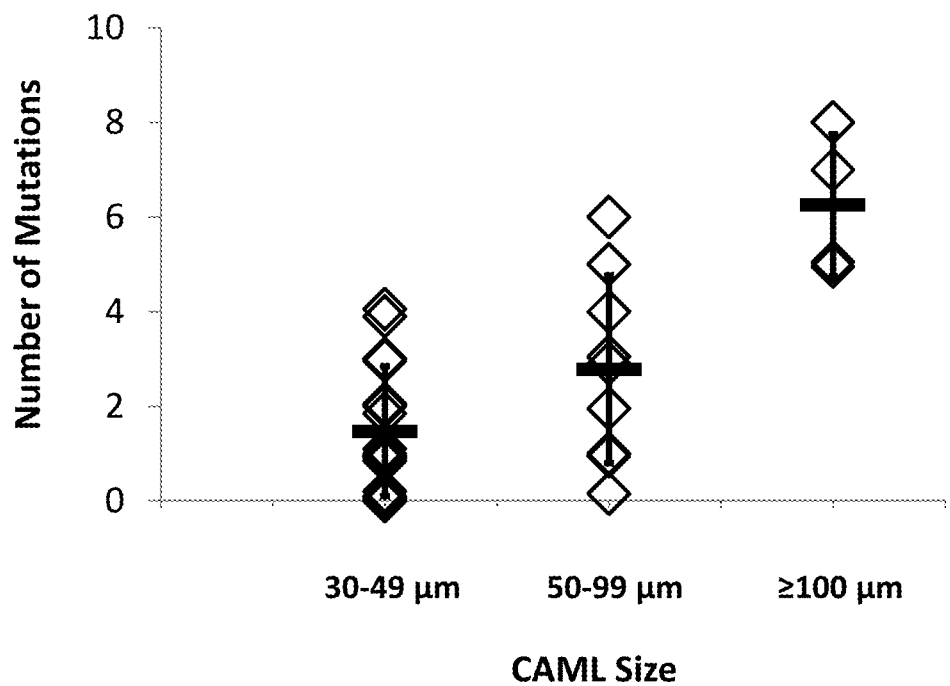

FIG. 5A is an analysis of the CAML size versus the number of oncogenic mutations found in those lysed CAMLs. The gene panel in Table 1 did not cover all the mutation in the cancers. There is a trend that smaller CAMLs have less oncogenic mutations while larger CAMLs have more oncogenic mutations. FIG. 5B is a different way of showing the correlation between size and the number of mutations where the number of mutations are plotted based on 50 μm size information presented in FIG. 4. It is clear that larger CAMLs have more mutations.

Figure 6:
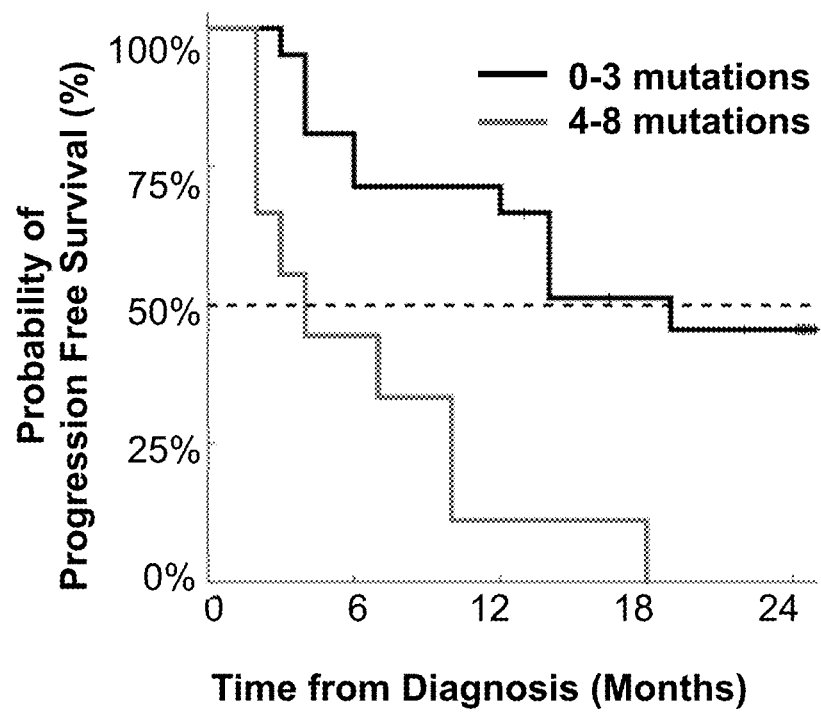
FIG. 6 shows that progression free survival is much shorter for patients with more mutations than with less mutations obtained from sequencing CAML nucleic acids.

FIG. 6 is an analysis of the number of oncogenic mutations obtained from sequencing CAML lysate using a 50 gene panel (Table 1) compared to progression free survival (PFS) of 30 patients with lung cancer. The blood samples were collected before the start of treatment. FIG. 6 shows that if the cancer patients had 4 or more mutations, the patients progressed at an increased rate compared to patients with 0-3 mutations in their CAML lysate.

Clinical Utility

CAMLs are found in all stages of cancer and all the major cancers. Nucleic acids from CAMLs that are sequenced show cancer associated molecular changes. Thus, collecting giant cells and giant naked nuclei from patient samples followed by molecular analysis, and the detection of cancer associated molecular changes is an indication of presence of solid tumor cancer. Cancer screening can also be based on combination of enumeration of giant cells, giant naked nuclei and detection of cancer associated molecular changes after enumeration.

It is well known based on tissue biopsy that new cancer associated molecular change is an indication of drug resistance for drug treatments for specific mutations. Change in the identity and/or number of mutations can be obtained sequentially in time by collecting giant cells and giant naked nuclei from patient samples followed by molecular analysis. Thus, determination of resistance to treatment of cancer can be obtained by appearance of new cancer associated molecular changes obtained from giant cells and giant naked nuclei from patient samples. Detection of resistance can also be based on combination of enumeration of giant cells, giant naked nuclei and detection of cancer associated molecular changes after enumeration.

FIGS. 4 and 5 show that the number of mutations obtained from giant cells and giant naked nuclei from the blood of cancer patients can provide prognosis of cancer. The prognosis can be based on the combination of giant cell sizes and the number of mutation detection from giant cells and giant naked nuclei.

As shown in FIG. 5, in patients with more mutations, the PFS is shorter. Similarly, shown herein is that patients with CAMLs increasing in size is an indicator of disease progression. In FIG. 4, more mutations are found in larger CMALs. The increase of the number of cancer associated molecular changes obtained from giant cells and giant naked nuclei from the blood of cancer patients indicate progression of cancer. The disease progression can also be based on the combination of giant cell sizes and the increase of number of cancer associated molecular changes from giant cells and giant naked nuclei from patient samples. Complete disappearance of CAMLs and cancer associated molecular changes is an indication of successful treatment response.

When treatment is stopped, such as after surgery, after chemoradiation therapy or after other therapy, there is not always an accurate method to determine if there is still remaining residual disease. CT or MRI cannot always provide the information of small residual tumor. If there is residual disease, the cancer will recur. If an oncologist is informed there is residual disease, the oncologist might be able to provide treatment to eliminate the residual disease. Residual cancer can be detected by the presence of previously known cancer associated molecular changes obtained from giant cells and giant naked nuclei from patient samples. The residual disease can also be based on the combination of existence of giant cells and the detection of cancer associated molecular changes from giant cells and giant naked nuclei from the patient samples.

Many cancer patient can be cancer free after treatment. They can be in remission for a few months to remaining lifetime. Those patients are very interested to know that they remain cancer free. The detection of cancer associated molecular change obtained from collecting intact nucleic acids obtained from giant cells and giant naked nuclei in blood samples of the patient is an indication of cancer. If the molecular change is the same as the previous cancer associated molecular change of the patient, the patient is having recurrence of the previous cancer. The detection of recurrence can also be based on the combination of enumeration of giant cell and the cancer associated molecular changes detection from giant cells and giant naked nuclei from patient samples.

If the cancer associated molecular change detected in patients in remission is different from the previous cancer associated molecular change, the patient is developing a new cancer, not recurrence. The detection of new cancer of patients in remission can also be based on the combination of enumeration of giant cell and the cancer associated molecular change detected from giant cells and giant naked nuclei from patient samples.

Most cancers have associated premalignant conditions of solid tumors not yet matured to stage I, for example ductal carcinoma in situ (DCIS) for breast cancer. The probability that DCIS will advance to stage I breast cancer is low. There are deferent grades of DCIS, some more likely to advance to Stage I. As shown in a paper by D. L. Adams [1], CAMLs were detected in those patients. Some of those patients with premalignant conditions might want to be treated to prevent advancing to cancer. The detection of premalignant conditions of solid tumors can be based on detection of cancer associated molecular changes from giant cells and giant naked nuclei from patient samples. The detection of premalignant conditions can also be based on the combination of enumeration of giant cell and the detection of cancer associated molecular changes from giant cells and giant naked nuclei from patient samples.

CITATIONS

1. Adams D L, Martin S S, Alpaugh R K, Charpentier M, Tsai S, Bergan R C, Ogden I M, Catalona W, Chumsri S, Tang C M, Cristofanilli M. Circulating giant macrophages as a potential biomarker of solid tumors. *PNAS* 111:3514-3519 (2014).
2. Adams D L, Adams D K, Alpaugh R K, Cristofanilli M, Martin S S, Chumsri S, Tang C M, Marks J R, Circulating Cancer Associated Macrophage-Like Cells differentiate malignant breast cancer and benign breast conditions. *Cancer Epidemiology, Biomarkers & Prevention* 25:1037-1042 (2016).
3. Tang C M, Zhu P, Li S, Makarova O V, Amstutz P T, Adams D L, Filtration and Analysis of Circulating Cancer Associated Cells from the Blood of Cancer Patients, Biosensors and Biodetection: Methods and Protocols, Volume 2: Electrochemical, Bioelectronic, Piezoelectric, Cellular and Molecular Biosensors, Second Edition, Editors: Ben Prickril and Avraham Rasooly, New York: Humana Press, 2017, Chapter 32, pp. 511-524.
4. Zhu P, Stanton M L, Castle E P, Joseph R W, Adams D L, Li S, Amstutz P, Tang C M, Ho T H, Detection of Tumor-Associated Cells in Cryopreserved Peripheral Blood Mononuclear Cell Samples for Retrospective Analysis. *J. Translational Medicine* 14:198 (2016).
5. Adams D L, Adams D K, He J, Kalhor N, Zhang M, Xu T, Gao H, Reuben J M, Qiao Y, Komaki R, Liao Z, Edelman M J, Tang C-M, Lin S H, Sequential tracking of PD-L1 expression and RAD50 induction in circulating tumor and stromal cells of lung cancer patients undergoing radiotherapy. *Clinical Cancer Research* 23:5948-5959 (2017).
6. Adams D L, Adams D K, Lin S H, Cristofanilli M, Bergan R C, Marks J, Martin S S, Chumsri S, Ho T H, Lapidus R G, Tsai S, Tang C M, Katherine Alpaugh R K, Cancer-associated macrophage-like cells as prognostic indicators of overall survival in a variety of solid malignancies. *Journal of Clinical Oncology* 35(15):11503-11503 (2017).
7. Adams D L, Alpaugh R K, Ho T H, Lin S H, Marks J R, Bergan R, Martin S S, Chumsri S, Tang C-M, Cristofanilli M, Multiplex phenotyping of circulating cancer associated macrophage-like cells in patients with solid tumors. *Proc. of the AACR,* 2017 Apr. 1-5; Washington, DC. Philadelphia (PA): AACR; Cancer Res 2017;77(13 Suppl):Abstract nr 3798.
8. Adams D L, Zhu P, Makarova O V, Martin S S, Charpentier M, Chumsri S, Li S, Amstutz P, Tang C M. The systematic study of circulating tumor cell isolation using lithographic microfilters. RSC Adv 2014; 4:4334-4342.
9. Adams D L, Stefansson S, Haudenschild C, Martin S S, Charpentier M, Chumsri S, Cristofanilli M, Tang C-M and Alpaugh R K. Cytometric characterization of circulating tumor cells captured by microfiltration and their correlation to the CellSearch® CTC test. Cytometry Part A 2015;87A:137-144.
10. Adams D L, Alpaugh R K, Martin S S, Charpentier M, Chumsri S, Cristofanilli M, Adams D K, Makarova O V, Zhu P, Li S, Tang C M and Stefansson S, Precision microfilters as an all in one system for multiplex analysis of circulating tumor cells, RSC Advances 2016: 6: 6405-6414.
11. Adams D L, Adams D K, Stefansson S, Haudenschild S C, Martin S S, Charpentier M, Chumsri S, Cristofanilli M, Tang C M, Alpaugh R K, Mitosis in Circulating Tumor Cells stratifies highly aggressive breast carcinomas, Breast Cancer Research, 2016, 18:44.
12. Makarova O V. Adams D L, Divan R, Rosenmann D, Zhu P, Li S, Amstutz P, Tang C M, Polymer microfilters with nanostructured surfaces for the culture of circulating cancer cells, Materials Science and Engineering: C, 2016, 66:193-198.
13. Stefansson S, Adams D L, Erschler W B, Le H, Ho D, A Cell Transportation Solution that Preserves Live Circulating Tumor Cells in Patient Blood Samples, BMC Cancer, 2016, 16:300.
14. Adams D L, Alpaugh R K, Tsai S, Tang C M, Stefansson S, Multi-phenotypic subtyping of circulating tumor cells using sequential fluorescent quenching and restaining, Scientific Reports 2016, 6:33488
15. Pillai S G, Zhu P, Siddappa C M, Adams D L, Li S, Makarova O V, Amstutz P, Nunley R, Tang C M, Watson M A, Aft R, Enrichment and Molecular Analysis of Breast Cancer Disseminated Tumor Cells from Bone Marrow Using Microfiltration, PLoS ONE, 2017, 12(1): e0170761.
16. Adams, D. L. & Cristofanilli, M. Detecting and Monitoring Circulating Stromal Cells from Solid Tumors Using Blood-Based Biopsies in the Twenty-First Century: Have Circulating Stromal Cells Come of Age? in Liquid Biopsies in Solid Tumors (ed. Cristofanilli, M.) 81-104 (Springer International Publishing, Cham, 2017).

17. Hayashi M, Zhu P, McCarty G, Meyer C F, Levin A, Morris C D, Albert C M, Jackson K W, Tang C-M, and Loeb D M. Size-based detection of sarcoma circulating tumor cells and cell clusters, Onco Target 2017; 8(45).

We claim:

1. A method of determining cancer progression in a subject, said method comprising:
   (a) isolating giant cells, and optionally giant cell naked nuclei, from a biological sample of a subject having cancer,
   (b) determining the size of the giant cells and determining the number of cancer-associated mutations in the giant cells and/or giant cell naked nuclei, and
   (c) determining cancer is progressing in the subject based on changes in the size and the number determined in (b),
   wherein when the size of the giant cells increase and the number of the cancer-associated mutations increase, in comparison to the size of giant cells and the number of the cancer-associated mutations in giant cells and/or giant cell naked nuclei isolated from a sample obtained from the subject at an earlier time point, cancer is determined to be progressing in the subject,
   wherein the giant cells and giant cell naked nuclei are isolated from the biological sample using size exclusion methodology, and wherein the size exclusion methodology is a filter having a pore size that retains giant cells and giant cell naked nuclei of 8 microns and giant cells and giant cell naked nuclei greater than 8 microns, and
   wherein the giant cells are polynucleated cells ranging in size from 25-300 μm.

2. The method of claim 1, wherein the nuclei are intact or undegraded nuclei.

3. The method of claim 1, wherein the determining the number of cancer-associated mutations is performed on a single giant cell, a group of two or more giant cells, a single giant cell naked nuclei, group of two or more giant cell naked nuclei, or a combination thereof.

4. The method of claim 1, further comprising determining the number of cancer-associated mutations in one or more of circulating tumor cells (CTCs), circulating endothelial cells (CECs), and epithelial mesenchymal transition cells (EMTs), wherein said CTCs, CECs, and EMTs are isolated from the biological sample in conjunction with isolating the giant cells and/or giant cell naked nuclei from the biological sample.

5. The method of claim 1, further comprising subjecting the giant cells and/or giant cell naked nuclei to fluorescent antibody and/or colorimetric staining prior to determining the number of cancer-associated mutations.

6. The method of claim 1, further comprising enumerating the giant cells and/or giant cell naked nuclei prior to determining the number of cancer-associated mutations.

7. The method of claim 1, wherein the cancer-associated mutations is a single mutation.

8. The method of claim 1, wherein the cancer-associated mutations is 2-5 mutations.

9. The method of claim 1, further comprising repeating the method at least once to obtain a second set of cancer-associated mutations, and comparing the first and second sets of changes.

10. The method of claim 1, wherein the subject has a cancer selected from the group consisting of breast, prostate, pancreatic, NSCLC, sarcoma, kidney, bladder, colon, colorectal, uterine sarcoma, neuroblastoma, esophageal, ovarian, melanoma, liver, and lung cancer.

11. A method for predicting progression free survival (PFS) in a subject, said method comprising:
    (a) isolating giant cells, or giant cell naked nuclei, or both, from a biological sample of a subject having cancer,
    (b) determining the number of cancer-associated mutations in the giant cells and giant cell naked nuclei, wherein the mutations are determined in each of the following group of genes: ABL1, IDH2, FGFR1, PTEN, EGFR, AKT1, JAK2, FGFR2, RB1, ERBB2, ALK, JAK3, FGFR3, RET, ERBB4, APC, KDR, FLT3, SMAD4, EZH2, ATM, KIT, GNA11, SMARCB1, FBXW7, BRAF, KRAS, GNAQ, SMO, NPM1, CDH1, MET, GNAS, SRC, NRAS, CDKN2A, MLH1, HNF1A, STK11, PDGFRA, CSF1R, MPL, HRAS, TP53, PIK3CA, CTNNB1, NOTCH1, IDH1, VHL and PTPN11, and
    (c) predicting PFS in the subject based on changes in the number determined in (b),
    wherein when the number of cancer-associated mutations is determined to be three or less, the subject is predicted to have a greater likelihood of longer PFS than a subject having four or more cancer-associated mutations,
    wherein the giant cells and giant cell naked nuclei are isolated from the biological sample using size exclusion methodology, and wherein the size exclusion methodology is a filter having a pore size that retains giant cells and giant cell naked nuclei of 8 microns and giant cells and giant cell naked nuclei greater than 8 microns, and
    wherein the giant cells are polynucleated cells ranging in size from 25-300 μm.

12. The method of claim 11, wherein the nuclei are intact or undegraded nuclei.

13. The method of claim 11, wherein the analysis is performed on a single giant cell, a group of two or more giant cells, a single giant cell naked nuclei, group of two or more giant cell naked nuclei, or a combination thereof.

14. The method of claim 11, further comprising assaying for cancer-associated mutations in one or more of circulating tumor cells (CTCs), circulating endothelial cells (CECs), and epithelial mesenchymal transition cells (EMTs), wherein said CTCs, CECs, and EMTs are isolated from the biological sample in conjunction with isolating the giant cells and/or giant cell naked nuclei from the biological sample.

* * * * *